(12) United States Patent
Chao et al.

(10) Patent No.: US 7,768,918 B2
(45) Date of Patent: Aug. 3, 2010

(54) METHOD FOR EXPANDING THE SERVICE VLAN SPACE OF A PROVIDER NETWORK

(75) Inventors: Yun-Fei Chao, Taipei (TW); Wei-Pin Chen, Taipei (TW)

(73) Assignee: VIA Technologies Inc., Hsin-Tien, Taipei (TW)

( * ) Notice: Subject to any disclaimer, the term of this patent is extended or adjusted under 35 U.S.C. 154(b) by 795 days.

(21) Appl. No.: 11/427,283

(22) Filed: Jun. 28, 2006

(65) Prior Publication Data

US 2008/0002720 A1    Jan. 3, 2008

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04L 12/28* (2006.01)
*H04L 12/56* (2006.01)
*H04W 4/00* (2009.01)

(52) U.S. Cl. .................. 370/231; 370/232; 370/338; 370/392; 370/395.53

(58) Field of Classification Search ............. 370/338, 370/389, 392, 395.5, 395.53
See application file for complete search history.

(56) References Cited

U.S. PATENT DOCUMENTS

| | | | | |
|---|---|---|---|---|
| 6,414,956 B1* | 7/2002 | Szczepanek | | 370/392 |
| 6,639,901 B1* | 10/2003 | Katzri et al. | | 370/255 |
| 6,771,673 B1* | 8/2004 | Baum et al. | | 370/535 |
| 6,990,106 B2* | 1/2006 | Bhatia | | 370/395.53 |
| 7,079,544 B2* | 7/2006 | Wakayama et al. | | 370/401 |
| 2002/0146026 A1* | 10/2002 | Unitt et al. | | 370/428 |
| 2003/0126286 A1* | 7/2003 | Lee | | 709/238 |
| 2004/0042454 A1* | 3/2004 | Zabihi et al. | | 370/392 |
| 2004/0236720 A1* | 11/2004 | Basso et al. | | 707/1 |
| 2005/0163132 A1* | 7/2005 | Mieno et al. | | 370/395.53 |
| 2006/0002370 A1* | 1/2006 | Rabie et al. | | 370/351 |
| 2006/0248227 A1* | 11/2006 | Hato et al. | | 709/245 |
| 2009/0041023 A1* | 2/2009 | Ould Brahim et al. | | 370/395.3 |

OTHER PUBLICATIONS

Philippe Klein, Nurit Sprecher, Provider Ethernet VLAN Cross Connect, Jan. 2006, Siemens.*

* cited by examiner

*Primary Examiner*—Daniel J Ryman
*Assistant Examiner*—Nishant B Divecha
(74) *Attorney, Agent, or Firm*—Thomas, Kayden, Horstemeyer & Risley (57) ABSTRACT

A method for expanding a service VLAN space of a provider network is provided. A bit number occupied by a taq protocol identifier (TPID) in a TPID field is reduced to leave a plurality of spare bits. The spare bits of the TPID field is then used to represent a first portion of a service VLAN identifier. A VLAN identifier field of a tag control information (TCI) field is used to represent a second portion of the service VLAN identifier. The first and second portions are then combined to obtain the service VLAN identifier of the packets completely.

5 Claims, 7 Drawing Sheets

METHOD FOR EXPANDING THE SERVICE VLAN SPACE OF A PROVIDER NETWORK

BACKGROUND OF THE INVENTION

1. Field of the Invention

The invention relates to a network, and more particularly to the service VLAN space of a provider network.

2. Description of the Related Art

Unlike a physical LAN, a Virtual LAN (VLAN) is a logically-independent network. The IEEE 802.1Q standard provides a tagging protocol, which appends a VLAN tag to the packet header to indicate the presence of VLAN information. The tagging protocol allows the VLAN to come into practice. Ordinarily, a VLAN tag is used to mark a logical subgroup or VLAN to which a packet belongs within a physical LAN, and the VLAN is thus established. This kind of VLAN tag is called a customer VLAN tag.

An Internet Service provider (ISP) is an organization, which provides Internet access to customers, and the network of the ISP is called a provider network. Similarly, with regard to the ISP, the VLAN tag is used to mark a logical subgroup to which a packet belongs within the provider network, and the packet can be rapidly forwarded according to the VLAN tag appended by the provider network. This kind of VLAN tag is called a service VLAN tag. The service VLAN tag and the customer VLAN tag can coexist in the provider network without interference.

Figure 1:
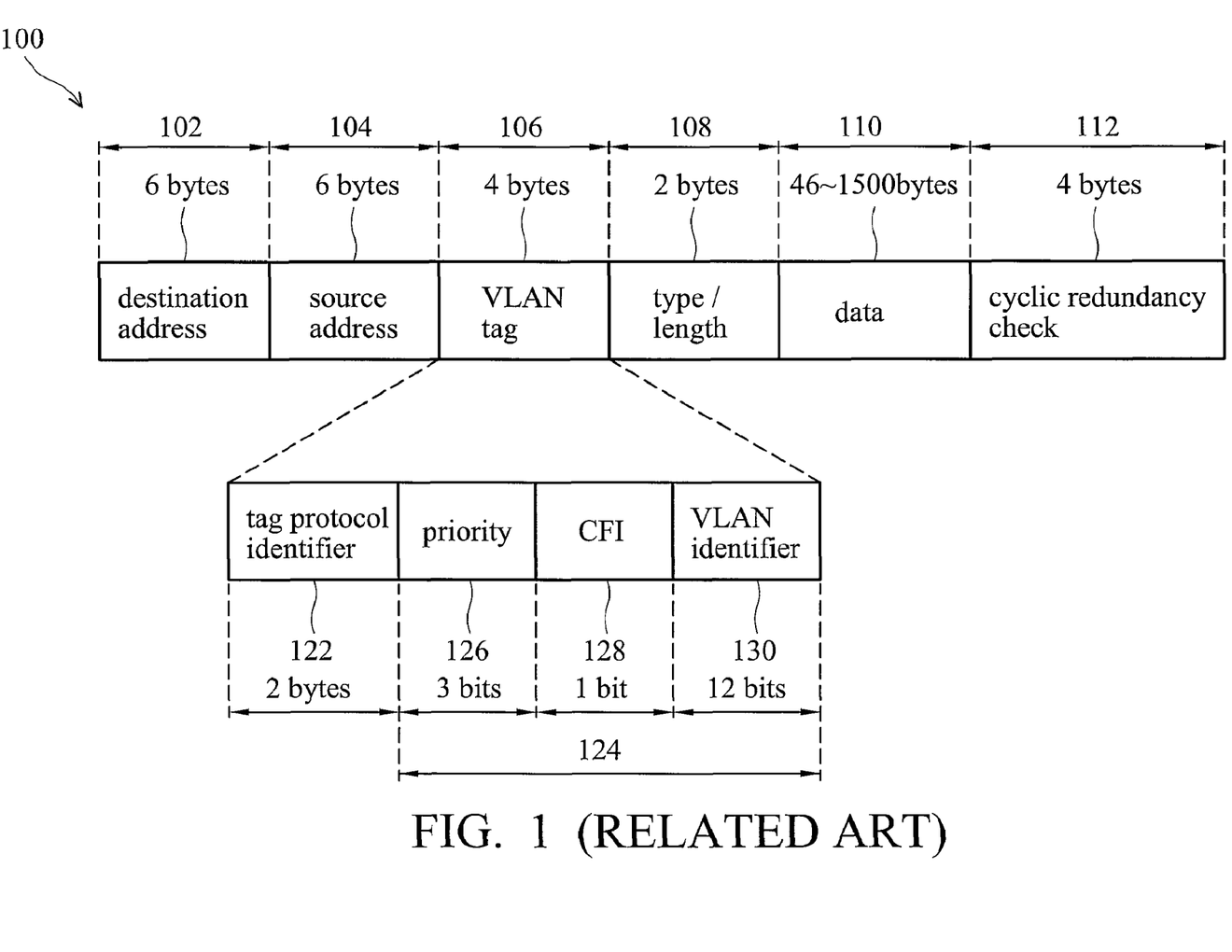
FIG. 1 is an Ethernet frame format including a VLAN tag conforming to the IEEE 802.1Q standard.

FIG. 1 is an Ethernet frame format 100 including a VLAN tag conforming to the IEEE 802.1Q standard. The Ethernet frame 100 includes two Media Access Control (MAC) address fields 102 and 104, a VLAN tag field 106, a type/length field 108, a data field 110, and a cyclic redundancy check field 112. The length of both the destination address field 102 and the source address field 104 are 6 bytes, and respectively stores the destination and source MAC addresses. A 4-byte VLAN tag field 106 is inserted between the source address field 104 and the type/length field 108, storing information about the VLAN to which the frame 100 belongs. The type/length field 108 is followed by a data field 110, which is about 46~1500 bytes in length and carries the user data. The CRC field 112 is 4 bytes in length and stores the checksum of the data.

The VLAN tag field 106 includes a tag protocol identifier (TPID) field 122 and a tag control information (TCI) field 124. The TPID field 122 is 16 bits in length and stores a TPID indicating that a VLAN tag header follows. The TCI field 124 further includes a user priority field 126, a canonical format indicator (CFI) field 128, and a VLAN identifier field 130. The user priority field 126 is 3 bits in length and stores the priority level of the Ethernet frame 100. The CFI field 128 is 1 bit in length. The VLAN identifier field 130 is 12 bits in length and stores a VLAN identifier indicating the VLAN to which the Ethernet frame 100 belongs.

A service VLAN space is the number of assignable service VLAN identifiers assigned by an ISP to customer equipment. The greater the number of customers accessing the Internet through the provider network, the larger the service VLAN space, the more flexibility the ISP has to group the packets, and the more efficiently the provider network functions due to the provider network forwarding the packets according to the service VLAN tag. Under the current IEEE 802.1Q standard, however, the service VLAN space contains only 4096 (i.e. $2^{12}$) identifiers because the VLAN identifier field 130 of the VLAN tag header 106 is only 12 bits in length. This means an ISP can allocate a maximum of 4096 service VLAN identifiers to customer equipment, but the amount of customer equipment connected to the provider network of an ISP is far greater than 4096. Therefore, a method for expanding the service VLAN space of a provider network is desirable.

BRIEF SUMMARY OF THE INVENTION

The invention provides a Virtual Local Area Network (VLAN) tag for being appended to a packet. The VLAN tag includes a shortened tag protocol identifier (TPID) field, of which the length is less than that of a standard TPID, for indicating that a VLAN tag header is following, a VLAN identifier that includes an original VLAN identifier field that is 12 bits in length and an extra VLAN identifier field, which is obtained by decreasing the bit number of the standard TPID, a user priority field that is 3 bits in length for indicating a packet priority, and a canonical format indicator (CFI) field that is 1 bit in length.

The invention also provides a method for expanding the service VLAN space of a provider network. The provider network forwards a plurality of packets of a plurality of customer equipment. The packets are further guided in the provider network according to a service VLAN identifier of a service VLAN tag header of the packets. The service VLAN tag header comprises a 2-byte tag protocol identifier (TPID) field and a 2-byte tag control information (TCI) field. The bit number occupied by a TPID in the TPID field is first decreased to leave a plurality of spare bits. The spare bits of the TPID field are then used to represent a first portion of the service VLAN identifier. A VLAN identifier field of the TCI field is used to represent a second portion of the service VLAN identifier. Both the first and second portions are then combined to obtain the service VLAN identifier of the packets.

The invention also provides a provider network, which forwards a plurality of packets sent by a plurality of customer equipment. The provider network comprises a plurality of first networking devices coupled to some of the customer equipment and a plurality of second networking devices. The first networking devices determine a service VLAN identifier of a service VLAN tag header of the packets and append the service VLAN tag header to the packets according to a service VLAN tag format when the packets enters the provider network, and remove the service VLAN tag header from the packets according to the service VLAN tag format when the packets leave the provider network. The service VLAN tag format comprises a 2-byte tag protocol identifier (TPID) field and a 2-byte tag control information (TCI) field, the TPID field comprises a (16-N) bit shortened TPID field indicating that the service VLAN tag header is following and a N-bit extra VLAN identifier field, the TCI field comprises a 3-bit user priority field, a 1-bit canonical format indicator (CFI) field and a 12-bit original VLAN identifier field, and the extra and original VLAN identifier fields are combined to represent the (12+N)-bit VLAN identifier of the packets. The second networking devices identify the existence of the service VLAN tag header by checking the shortened TPID field, read both the extra and original VLAN identifier fields of the packets to obtain the service VLAN identifier of the packets, and forward the packets according to the service VLAN identifier of the service VLAN tag header of the packets.

Moreover, the invention further provides a method for packet transmission. The method includes the following steps. First, a virtual-local-area-network (VLAN) tag is appended to a packet according to a service VLAN tag format when the packet enters the provider network. Next, the existence of the VLAN tag is identified by checking a shortened tag protocol identifier (TPID) field, and then both an extra VLAN identifier field and an original VLAN identifier field are read. Finally, the VLAN tag is removed from the packet according to the service VLAN tag format when the packet leaves the provider network.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
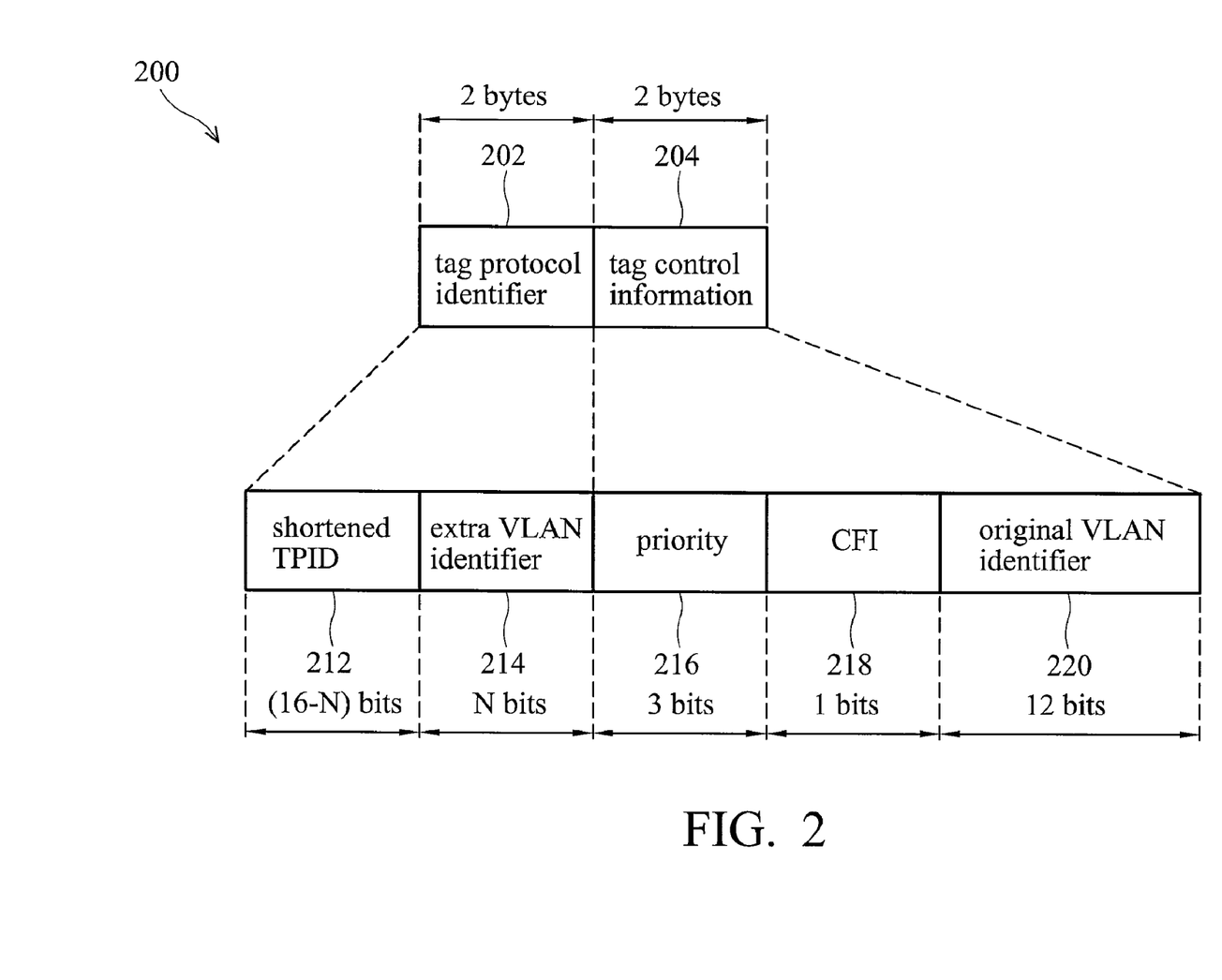
FIG. 2 is a service VLAN tag format for expanding the service VLAN space of a provider network according to the invention.

FIG. 2 is a service VLAN tag format 200 for expanding the service VLAN space of a provider network according to the invention. The provider network forwards packets, and a service VLAN tag header is appended to each of the packets by the provider network according to the service VLAN tag format 200. The service VLAN tag format 200 includes a tag protocol identifier (TPID) field 202 and a tag control information (TCI) field 204. Conforming to the IEEE 802.1Q standard, both the TPID field 202 and the TCI field 204 are 2 bytes in length. Accordingly, the TCI field 202 includes a 3-bit user priority field 216 indicating the packet priority, a 1-bit CFI field 218, and a 12-bit original VLAN identifier field 220.

The conventional TPID field holds 16 bits but is only used to identify the existence of the VLAN tag header, wasting finite bits of the VLAN tag header. If a networking device wants to identify the VLAN header of the received packets, it must read all 16 bits appearing after the MAC source address field of the packets, and the existence of the VLAN tag header is confirmed only if the 16 bit data is identical to a predetermined TPID. For example, according to the IEEE 802.1Q standard, the value of TPID is 8100H. The conventional VLAN identifier field, however, is only 12 bits, and can only support a service VLAN space of 4096 identifiers ($2^{12}$) for a provider network. If the number of bits held by the TPID can be reduced to save some spare bits for storing a portion of the VLAN identifier, the service VLAN space is expanded and an ISP can assign more service VLAN identifiers to customer equipment.

The TPID field 202 of the service VLAN tag format 200 includes a shortened TPID field 212. The shortened TPID field 212 is (16−N) bits in length, and contains a (16−N)-bit TPID to indicate that a service VLAN tag header is following, wherein N is a predetermined natural number. The TPID is predetermined by the ISP, and may be in the form of (16−N) consecutive bits of "0" or "1", such as "00000000" or "11111111" if N is equal to 8. Thus, the remaining N bits of the TPID field 202 is used as an extra VLAN identifier field 214, which contains an N bit second portion of the VLAN identifier. When a packet including a VLAN tag header conforming to the service VLAN tag format 200 traverses through the provider network, the second portion stored in the extra VLAN identifier field 214 and a first portion stored in the original VLAN identifier field 220 are combined together to obtain the service VLAN identifier of the packet. The extra VLAN identifier field 214 may include the more significant N bits of the service VLAN identifier, and the original VLAN identifier field 220 may include the less significant 12 bits of the service VLAN identifier. Contrariwise, extra VLAN identifier field 214 may include the less significant N bits, and the original VLAN identifier field 220 may include the more significant 12 bits. Thus, the service VLAN identifier is (12+N) bits in length, and the VLAN space of the provider network is expanded to the sum of ($4096*2^N$).

Figure 3:
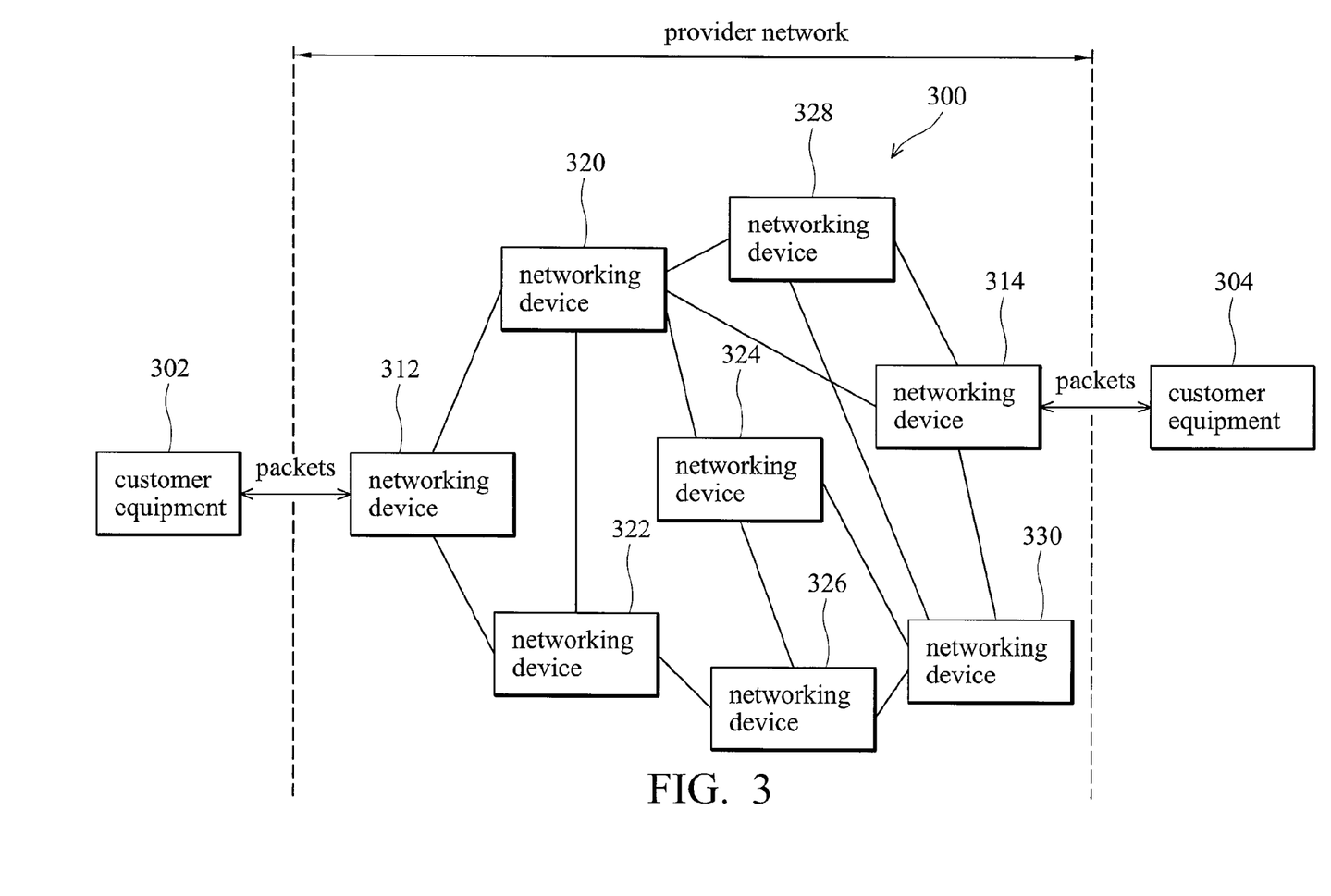
FIG. 3 shows a provider network adopting the service VLAN tag format according to the invention.

FIG. 3 shows a provider network 300 adopting the service VLAN tag format 200 according to the invention. The provider network 300 includes a plurality of connected networking devices 312-330, which may be network switches or routers. A customer equipment 302 sends a plurality of packets to the customer equipment 304 through the provider network 300. The packets are first delivered to networking device 312, which is directly connected to the customer equipment 302. Because the packets are guided in the provider network 300 according to a service VLAN identifier of a service VLAN tag header of the packets, the provider network 300 must appended the service VLAN tag headers to the packets when the packets enter the provider network 300. Thus, the networking device 312 first determines the service VLAN identifiers of the packets, and then appends the service VLAN tag header to the packets according to the service VLAN tag format 200. Thus, each of the packets has a service VLAN tag header 200 including a (16−N) bit shortened TPID field 212, a N-bit extra VLAN identifier field 214 and a 12-bit original VLAN identifier field 220 after the packets enter the provider network 300.

Figure 4A:
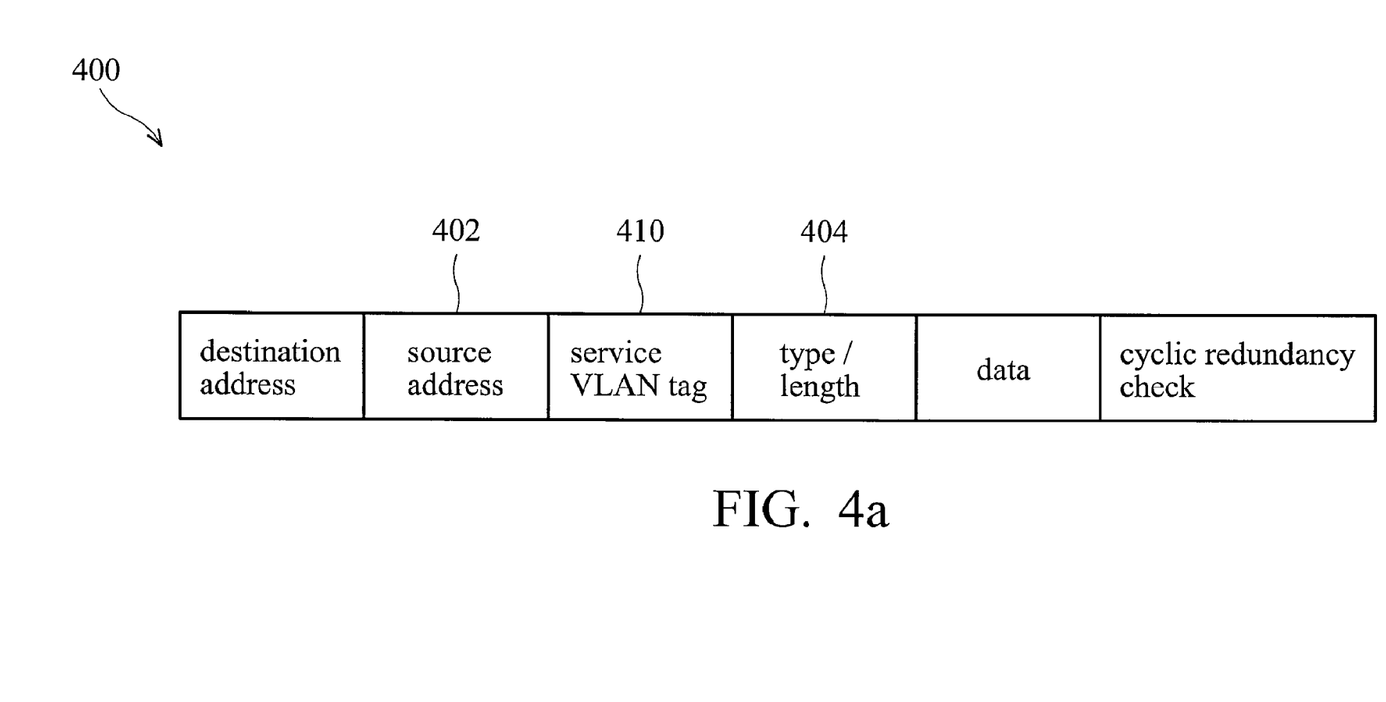
FIG. 4a shows an Ethernet frame of the packets tagged with the VLAN tag header according to the invention.
Figure 4B:
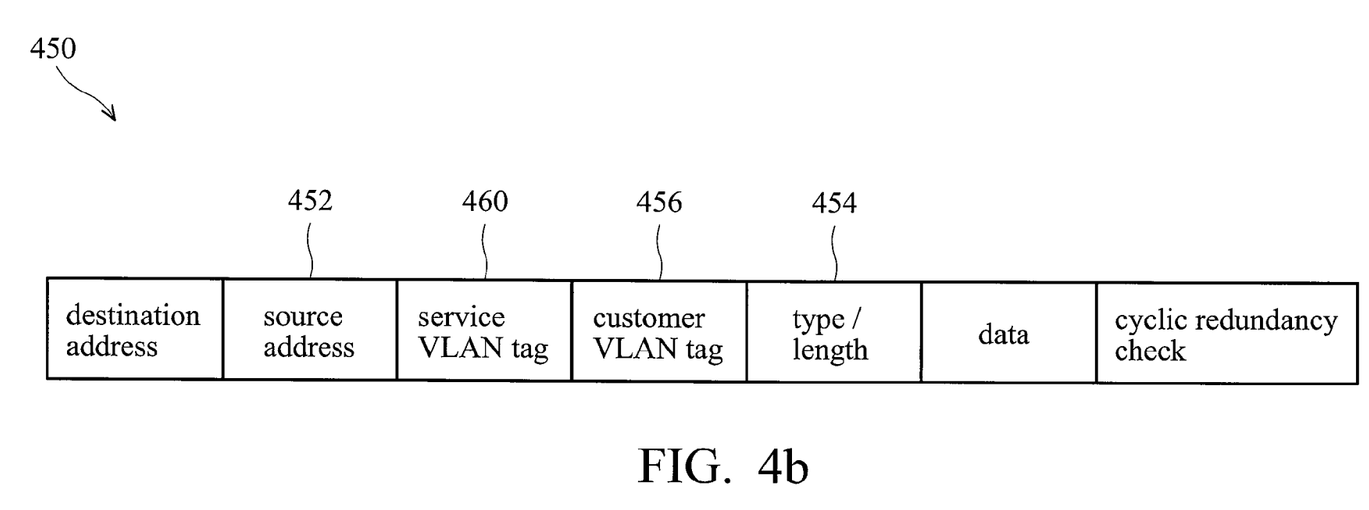
FIG. 4b shows another Ethernet frame of the packets tagged with the VLAN tag header according to the invention.

The service VLAN tag header may be inserted by the networking device 312 behind a source MAC address field of the packets. Referring to FIG. 4a, which shows a Ethernet frame 400 of the packets tagged with the VLAN tag header 410 according to the invention. In FIG. 4a, a service VLAN tag header 410 is inserted between a source address field 402 and a length-type field 404 of the packets. Referring to FIG. 4b, which shows another Ethernet frame 450 of the packets tagged with the VLAN tag header 460 according to the invention. Because the Ethernet frame 450 includes a customer VLAN tag header 456, a service VLAN tag header 460 is inserted between a source address field 452 and the customer VLAN tag field 456 of the packets.

After the packets are tagged with service VLAN tag headers, the packets are forwarded by the networking devices 312-330 according to the service VLAN identifiers stored in the service VLAN tag headers. The networking devices 320-330 identify the existence of the service VLAN tag header 200 by checking the shortened TPID field 212. If the packets have a service VLAN tag header 200, the networking devices 320-330 read both the extra and original VLAN identifier fields 214 and 220 of the packets to obtain the service VLAN identifier of the packets, and forward the packets according to the service VLAN identifier of the packets. Thus, the packets are guided in the provider network 300 according to the service VLAN identifier of the packets. The packets finally reach the networking device 314, which is directly connected to the customer equipment 304 that is the destination of the packets. Because the packets leave the provider network 300 through the networking device 314, the networking device 314 removes the service VLAN tag header from the packets according to the service VLAN tag format 200, and delivers the packets to customer equipment 304.

Since the service VLAN tag is appended and used in the provider network 300 itself and the service VLAN tag format 200 is not identical to the conventional service VLAN tag format, the service VLAN tag header of the packets can function without errors only if all networking devices 312-330 of the provider network 300 handle the service VLAN tag header of the packets according to the service VLAN tag format 200. Thus, the service VLAN identifier of the packets is (12+N) bits in length, and the VLAN space of the provider network 300 has been expanded to the sum of (4096*2$^N$).

Figure 5:
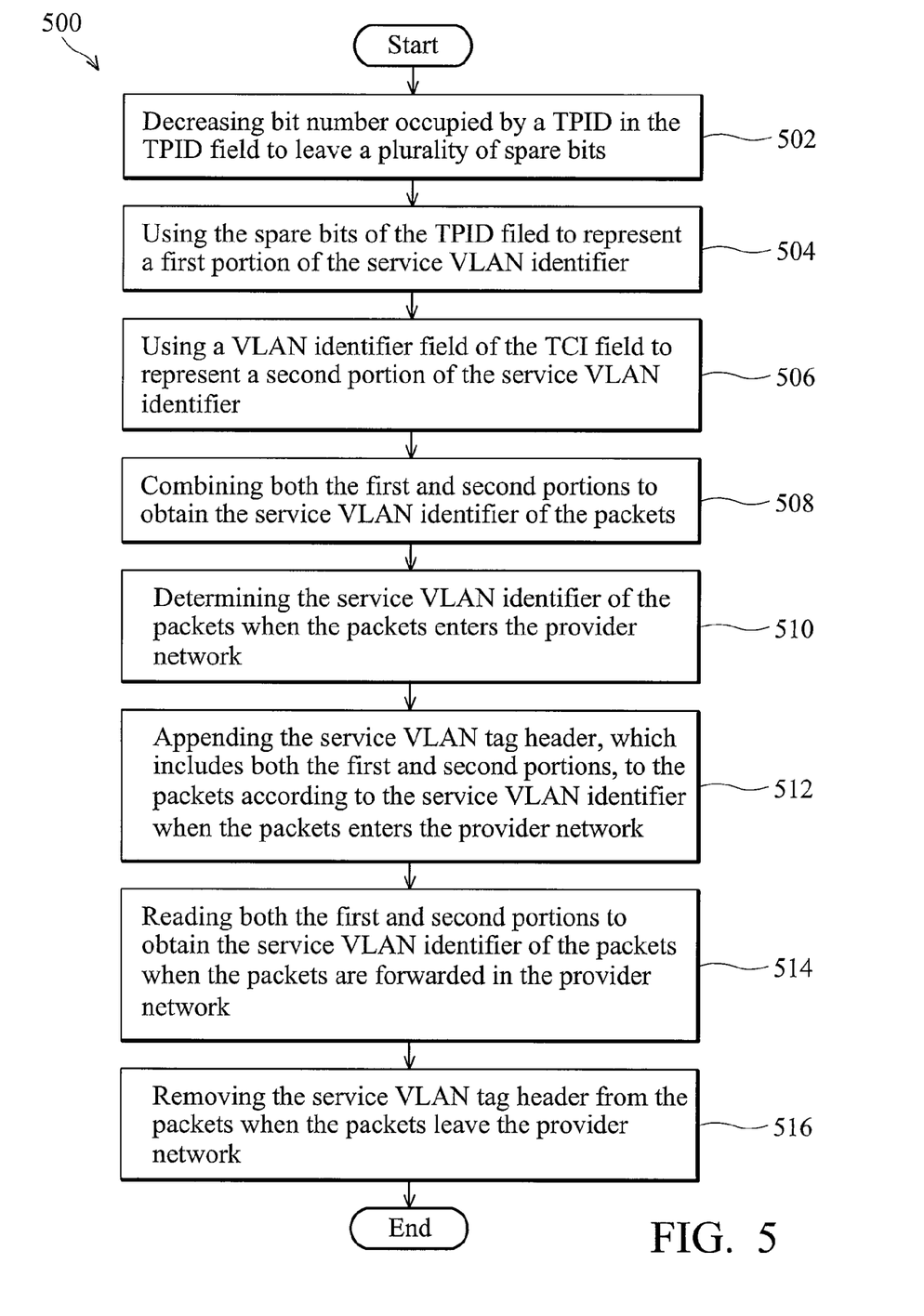
FIG. 5 is a flowchart of a method for expanding the service VLAN space of a provider network according to the invention.

FIG. 5 is a flowchart of a method 500 for expanding the service VLAN space of a provider network according to the invention. The bit number occupied by a TPID in the TPID field is first decreased in step 502 to leave a plurality of spare bits. The spare bits of the TPID field are then used to represent a first portion of the service VLAN identifier in step 504. A VLAN identifier field of the TCI field is then used to represent a second portion of the service VLAN identifier in step 506. Both the first and second portions are combined in step 508 to obtain the service VLAN identifier of the packets. If the number of the spare bits is N, the service VLAN identifier has an N-bit first portion. If the bit number of the VLAN identifier field of the TCI field is 12, the service VLAN identifier has a 12-bit second portion. Thus, after the first and second portions are combined, the (12+N)-bit service VLAN identifier is obtained, and the VLAN space of the provider network is expanded.

Each time when a packet enters the provider network, the service VLAN identifier of the packet is determined in step 510. A service VLAN tag header, which includes both the first and second portions, is then appended to the packet according to the service VLAN identifier when the packets enter the provider network in step 512. When the packets are forwarded in the provider network, both the first and second portions are read to obtain the service VLAN identifier of the packets in step 514. The service VLAN tag header is removed from the packet when the packet leaves the provider network in the step 516.

Figure 6:
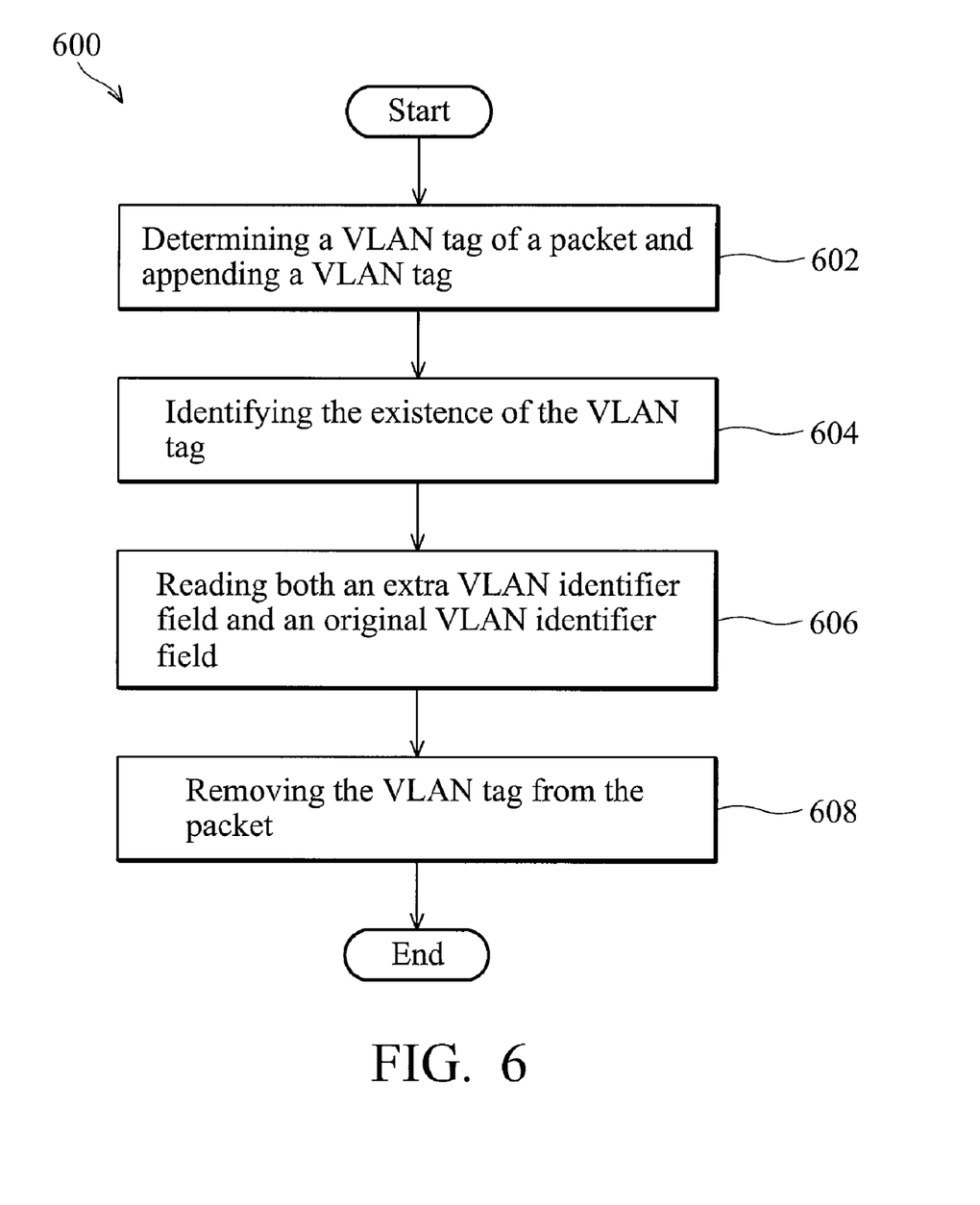
FIG. 6 is a flowchart of a method for packet transmission according to the invention.

Turning first to FIG. 6 and back to FIG. 3. FIG. 6 is a flowchart of a method 600 for packet transmission according to the invention. The method 600 includes the following steps. First, in step 602, a VLAN identifier of a VLAN tag of the packet is determined when the packet enters the provider network 300. After the VLAN tag is determined, the VLAN tag is appended to the packet according to a service VLAN tag format that includes a shortened TPID field, an extra VLAN identifier field, an original VLAN identifier field, a user priority field, and a canonical format indicator (CFI) field, wherein the length of the shorten TPID field, which indicates that a VLAN tag header is following, is less than that of a standard TPID and the extra VLAN identifier field is obtained by decreasing the bit number of a standard TPID.

Next, in step 604, the existence of the VLAN tag is identified by checking the shortened TPID field. Sequentially, in step 606, both the extra VLAN identifier field and the original VLAN identifier field of the packet are reading to obtain a VLAN identifier of the packet by combining the extra VLAN identifier field and the original VLAN identifier field. Finally, in step 608, the VLAN tag is removed from the packet according to the service VLAN tag format when the packet leaves the provider network 300, and then the packet is forwarded.

Thus, the invention provides a method for expanding the service VLAN space of a provider network. The bit number occupied by a TPID in the TPID field is reduced to leave a plurality of spare bits, and the spare bits of the TPID field are then used to represent an extra portion of the service VLAN identifier. Thus, the bit number of the service VLAN identifier is increased, and the service VLAN space of a provider network is expanded.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A network control method, comprising:
   receiving a packet at an edge networking device of a provider network;
   determining first and second VLAN identifier fields for the received packet;
   appending within the received packet a service VLAN tag, wherein the service VLAN tag comprises:
      a modified tag protocol identifier (TPID) field, which is the length of a standard TPID field, consisting of:
         a shortened TPID subfield, the length of which is less than that of the standard TPID field, the length of the standard TPID field being 2 bytes, for indicating the presence of the first VLAN identifier field, wherein the shortened TPID subfield stores a series of bits with the same value; and
         the first VLAN identifier field consisting of the remainder of the length of the standard TPID field, inserted between the shortened TPID subfield and a user priority field;
      a standard tag control information (TCI) field consisting of:
         the second VLAN identifier field, which is 12 bits in length;
         the user priority field, which is 3 bits in length, for indicating a packet priority; and
         a canonical format indicator field, which is 1 bit in length,
      wherein appending further comprises checking the received packet for a customer VLAN tag,
      if the customer VLAN tag is present, then inserting the service VLAN tag immediately before the customer VLAN tag of the packet;
      otherwise inserting the service VLAN tag before a length-type field of the packet; and
   forwarding the packet through the service provider network according to a VLAN identifier stored in the first and second VLAN identifier fields of the service VLAN tag of the packet.

2. The network control method as claimed in claim 1, wherein the first VLAN identifier field includes the more significant bits of the VLAN identifier, and the second VLAN identifier field includes the less significant bits of the VLAN identifier.

3. The network control method as claimed in claim 1, wherein the first VLAN identifier field includes the less significant bits of the VLAN identifier, and the second VLAN identifier field includes the more significant bits of the VLAN identifier.

4. The network control method as claimed in claim 1, wherein the service VLAN tag is inserted between a source address field and the length-type field of the packets if the customer VLAN tag is not present.

5. The network control method as claimed in claim 1, wherein the service VLAN tag is inserted between a source address field and the customer VLAN tag of the packets if the customer VLAN tag is present.

* * * * *